United States Patent [19]
D'Alterio

[11] Patent Number: 4,745,935
[45] Date of Patent: May 24, 1988

[54] SUBMERGED NOZZLES IN TWO-ZONE BATH WHERE CONVEYOR BELTS PASS THROUGH A SLOTTED WALL

[76] Inventor: Joseph C. D'Alterio, 64 Sugar Maple La., Glen Cove, N.Y. 11542

[21] Appl. No.: 917,106

[22] Filed: Oct. 8, 1986

[51] Int. Cl.$^4$ .............................................. A23P 1/00
[52] U.S. Cl. .......................................... 134/75; 68/9; 68/158; 99/405; 134/127
[58] Field of Search ............... 134/64 R, 64 P, 73, 134/75, 127; 99/404, 405, 406, 443 C; 68/5 E, 9, 158, 175, 183

[56] References Cited

U.S. PATENT DOCUMENTS 4,270,317 6/1981 Kurie ........................... 134/64 R X
4,522,217 6/1985 D'Alterio ..................... 99/405 X Primary Examiner—Philip R. Coe
Attorney, Agent, or Firm—Paul W. Garbo

[57] ABSTRACT

In apparatus for treating a product in a liquid bath having two different temperature zones separated by a slotted wall and equipped with at least two continuous conveyor belts arranged to transport the product while captured between the belts through one zone, a slot in the wall and the other zone, a plurality of submerged nozzles are positioned with their orifices directed to eject pressurized fluid streams that contact the belts while passing through the slot. The nozzles promote the flow of liquid from one zone to the other and effect scrubbing of the belts. Baffles at the wall slot and parallel to the belts enhance the operational benefits of the nozzles.

14 Claims, 2 Drawing Sheets

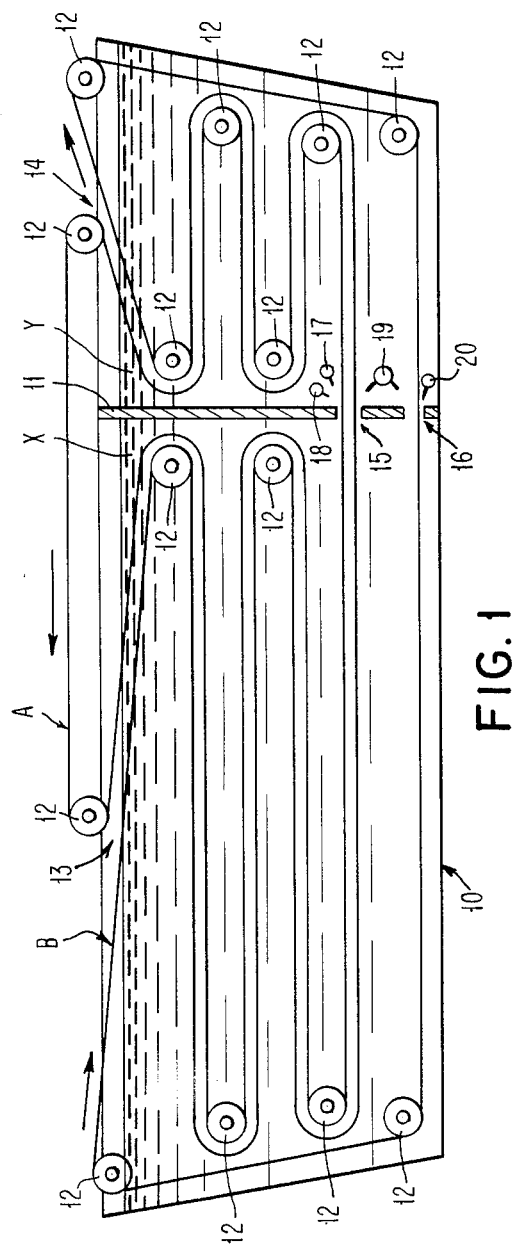
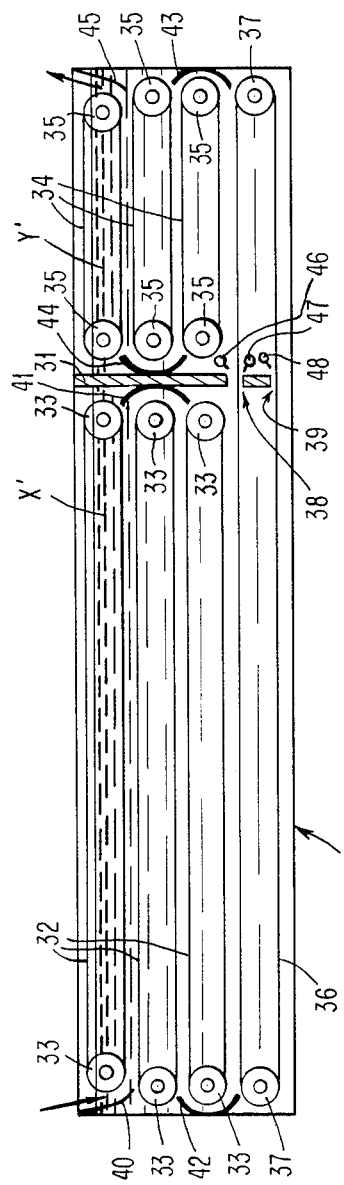
FIG. 1
FIG. 2

SUBMERGED NOZZLES IN TWO-ZONE BATH WHERE CONVEYOR BELTS PASS THROUGH A SLOTTED WALL

BACKGROUND OF THE INVENTION

This invention relates to appartus in which conveyors transport materials through a liquid bath having two different temperature zones separated by a slotted wall. More particularly, the invention involves means for promoting the flow of liquid from one temperature zone through the slotted wall to the other zone.

U.S. Pat. No. 4,522,217 to D'Alterio shows in FIG. 4 a commercially successful form of liquid bath having two temperature zones in which a pair of continuous conveyor belts transport a pasta product through a zone of boiling water and through a slotted wall into and through a zone of cold water.

U.S. Pat. No. 2,286,644 to Pringle et al illustrates in FIG. 1 another apparatus in which conveyor belts carry potato slices through a cooking vat containing vegetable oil and having a slotted wall for the passage of the conveyor belts therethrough. The slotted wall thus permits the maintenance of different temperatures in the oil on its opposite sides.

In all such systems wherein a substantial temperature difference is desired in the zones of the liquid bath which are on opposite sides of a slotted wall, it is difficult to prevent the temperature of the liquid bath in the vicinity of the slot from being at some level intermediate the two desired zone temperatures. The aforesaid patent of D'Alterio discloses steam chests and containers filled with insulation adjacent the slot and on opposite sides of the wall in the liquid bath to minimize the amount of liquid bath which is not at either of the two desired zone temperatures. The suggested means for minimizing intermediate temperature near the slot are helpful but cumbersome both structurally and operationally.

A principal object of this invention is to provide simple and effective means for minimizing the amount or portion of liquid at less than desired temperature near the slot in a wall which divides a liquid bath into zones of different temperatures.

Another important object is to provide means for more positive control of liquid flow in the desired direction through the slotted wall in a liquid bath divided thereby into two different temperature zones.

A further important object is to provide means to scour the product on the conveyor passing through the slotted wall to loosen and remove undesirable matter from the product treated in the liquid bath.

These and other features and advantages of the invention will be apparent from the description which follows.

SUMMARY OF THE INVENTION

In accordance with this invention, apparatus comprising continuous conveyor belts to transport a material while captured between belts through a liquid treating bath having two different temperature zones separated by a slotted wall through which the material is transported while submerged is provided with jets or nozzles that forcibly promote the flow of liquid from one temperature zone through the slotted wall to the other temperature zone of the liquid bath. In most cases, the higher temperature zone of the liquid bath has an appreciable loss of liquid through evaporation and, in such cases, make-up liquid is usually introduced from the lower temperature zone through the slotted wall. Hence, the jets of this invention are usually positioned and aimed to eject pressurized fluid streams through the slots in the wall into the higher temperature zone. The pressurized streams entrain liquid from the lower temperature zone through the wall slots into the higher temperature zone and thus facilitate positive liquid flow from one zone to the other in the desired direction.

While the liquid which forms the treating bath is in most cases used in the pressurized nozzles or jets, a gas or vapor may in some cases be the pressurized fluid ejected by the jets. For example, in the pasta cooking apparatus shown in FIG. 4 of U.S. Pat. No. 4,522,217, jets positioned in the cooling zone of the water bath could be used to eject streams of steam or hot pressurized air through the wall slots into the boiling water zone. The pressurized streams of steam or air would entrain water from the cooling zone through the wall slots into the boiling zone and thus enhance the desired water flow.

BRIEF DESCRIPTION OF THE DRAWINGS

For a fuller understanding of the invention, reference is made to the accompanying drawings of which:

FIG. 1 is a diagrammatic side elevation of a preferred system for treating a product conveyed through a liquid bath having two different temperature zones with conveyor belts extending from one zone through a slotted wall to the other zone wherein the nozzles of this invention are positioned in one zone to eject forceful fluid streams through the wall slots into the other zone;

FIG. 2 is similar to FIG. 1 and shows a different conveyor system in a liquid bath with two temperature zones having a slotted wall therebetween and equipped with the nozzles of this invention to shoot pressurized fluid streams through the wall slots;

DESCRIPTION OF PREFERRED EMBODIMENTS

Figure 4:
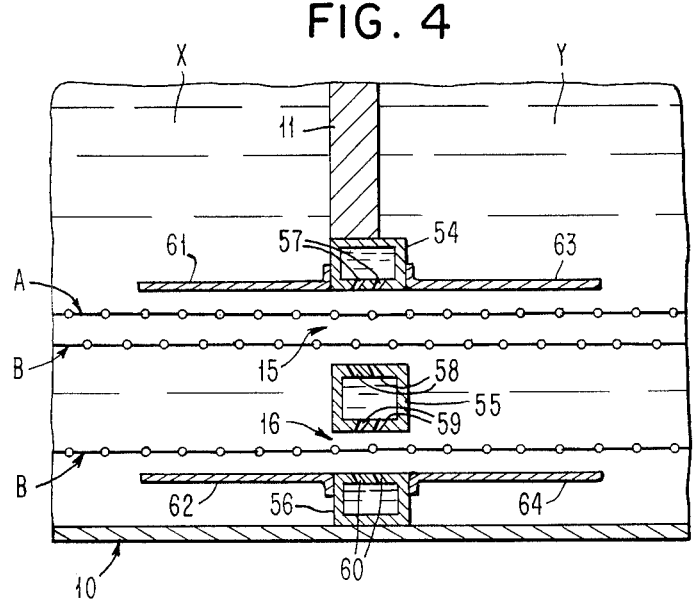
FIG. 4 is like FIG. 3 but shows another embodiment of the nozzles of this invention.

FIG. 1 is essentially a copy of FIG. 4 of U.S. Pat. No. 4,522,217 in which the nozzles of this invention have replaced the steam chests and containers filled with insulation shown in FIG. 4. Inasmuch as FIG. 4 is amply described in the patent, it will suffice to review only the principal elements of FIG. 1 herein.

In FIG. 1, tank 10 has an internal slotted wall 11 which divides tank 10 into two zones X,Y filled with the same liquid but maintained at different temperatures. Two mesh-type conveyor belts A,B have marginal openings which mesh with the teeth of driven sprockets 12. Belts A,B travel together in predetermined spaced relation from point 13 to point 14. The product to be treated in tank 10 is deposited on the portion of belt B above the liquid and becomes captured between belts A,B at point 13. After being transported through both zones X,Y of the liquid bath, the treated product is released by belt A at point 14 so that it can be removed from belt B. Internal wall 11 has wide slot 15 through which belts A,B and the product therebetween pass and narrow slot 16 through which the return run of belt B passes.

In accordance with this invention, nozzles 17,18, 19,20 are positioned in zone Y near wall 11 and aimed to discharge pressurized fluid streams through slots 15,16 into zone X. The pressurized jet streams from nozzles 17, 18,19,20 entrain liquid from zone Y through slots 15,16 into zone X and provide a scouring action on both belts A, B and the product therebetween so that any adherent matter developed during the treatment of the product in zone X is loosened and removed therefrom.

The essential difference between FIG. 2 and FIG. 1 is the conveyor system. Tank 30 has slotted wall 31 which divides the liquid bath into zones X', Y' maintained at different temperatures. Three parallel, spaced conveyor belts 32 on driven sprockets 33 are immersed in zone X' and three parallel, spaced conveyor belts 34 on driven sprockets 35 are immersed in zone Y'. Long conveyor belt 36 on driven sprockets 37 extends from zone X' to zone Y' with its upper run passing through wide slot 38 in wall 31 and its lower run passing through narrow slot 39 in wall 31.

Sprockets 33 of top conveyor belt 32 in zone X' rotate counterclockwise, sprockets 33 of the next lower belt 32 rotate clockwise, sprockets 33 of the lowest belt 32 rotate counterclockwise, sprockets 37 of long belt 36 rotate clockwise, while sprockets 35 of lowest belt 34 and top belt 34 in zone Y' rotate counterclockwise and sprockets 35 of middle belt 34 rotate clockwise. Therefore, product deposited on chute 40 is trapped between the lower run of top belt 32 and the upper run of middle belt 32 and conveyed to arced guide or baffle 41 where the product continues its travel in the reverse direction while held between the lower run of middle belt 32 and the upper run of bottom belt 32. Again at arced guide 42, the product moves down to the upper run of belt 36 where together with the lower runs of bottom belts 32,34 it is transported to arced baffle 43. There the product begins its upward progress through zone Y' by being carried between the top run of bottom belt 34 and bottom run of middle belt 34 to arced guide 44 where the movement of the product is reversed by the top run of middle belt 34 and the lower run of top belt 34 until the treated product is pushed up inclined baffle 45 for removal from the system.

Pursuant to this invention, nozzles 46,47,48 are disposed in zone Y' near wall 31 with their orifices directed into slots 38,39 so that pressurized fluid streams will entrain liquid from zone Y' into zone X' and effect a scouring action on the product as it passes on belt 36 through slot 38.

In the system of both FIG. 1 and FIG. 2, the conveyors carry the product to be treated along a zigzag path down through one zone of the liquid bath, through the slotted wall, and along a zigzag path up through the other zone. Hence, such conveyor arrangements can be tersely referred to as conveyors with zigzag travel; FIG. 1 has paired conveyor belts with zigzag travel, while FIG. 2 has multiple (more than two) conveyor belts with zigzag travel.

Figure 3:
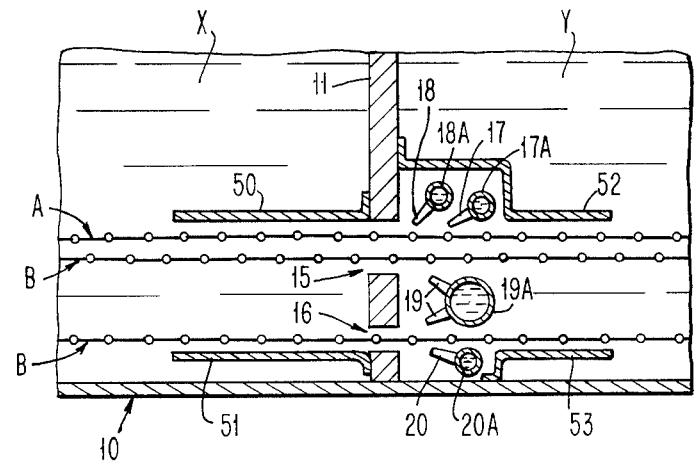
FIG. 3 is an enlarged and more detailed representation of the portion of FIG. 1 showing the slotted wall and adjacent nozzles.

FIG. 3 shows on an enlarged scale the portion of FIG. 1 involving the lower part of slotted wall 11 and nozzles 17,18,19,20. Conveyor belts A,B pass through wide, upper slot 15 of wall 11, carrying therebetween the product undergoing treatment from zone X to zone Y of the liquid bath. The return run of belt B passes through narrow, lower slot 16 in wall 11 which meets the bottom of tank 10. Each of nozzles 17,18,20 comprises a header 17A,18A,20A, respectively, disposed near and parallel to wall 11. The single nozzle appearing in FIG. 3 as nozzle 17 is actually a series of spaced, aligned nozzles attached to header 17A with their orifices directed to shoot fluid streams into wall slot 15. Similarly, a series of spaced, aligned nozzles 18 attached to header 18A have their orifices directed toward slot 15. The series of spaced, aligned nozzles 20 attached to header 20A have their orifices directed to eject fluid streams into and through wall slot 16. Header 19A has an upper series of spaced, aligned nozzles 19 with their orifices aimed into upper wall slot 15 and a lower series of spaced, aligned nozzles 19 with their orifices aimed into lower wall slot 16.

Fluid supplied to headers 17A,18A,19A,20A under pressure, e.g., 100 pounds per square inch, will issue as a multiplicity of high velocity jet streams entraining liquid from zone Y through wall slots 15,16 into zone X of the liquid bath in tank 10. Nozzles 17,18 will also exert a scrubbing action on conveyor belt A as well as the product therebelow carried on belt B while the upper series of nozzles 19 scrub belt B and the bottom of the product carried on belt B. Similarly, the lower series of nozzles 19 and the series of nozzles 20 scrub conveyor belt B returning from zone Y to zone X of the liquid bath in tank 10.

To minimize the amount of liquid in zone X which is not at its desired temperature as well as the amount of liquid in zone Y which is not at its desired different temperature, it is desirable to provide baffles extending from slotted wall 11 to form a restricted channel to and/or from slots 15,16. Thus, baffles 50,51 fastened to wall 11 form a channel in zone X of the liquid bath communicating with slots 15,16. Baffles 52,53 on the opposite side of wall 11 extend that channel in zone Y of the liquid bath. Either pair of baffles 50,51 or 52,53 helps to limit the amount of liquid not at its desired optimum temperature but both pairs of baffles 50,51 and 52,53 further limit the amount of liquid not at its desired temperature. It is evident that the channel formed by baffles 50,51,52,53 is substantially linear and parallel to conveyor belts A,B passing therethrough.

FIG. 4 is similar to FIG. 3 but shows another embodiment of the nozzles of this invention. In this case, slotted wall 11 comprises three parallel and spaced ducts 54,55,56, the space between ducts 54,55 providing upper slot 15, and the space between ducts 55,56 providing lower slot 16. The bottom wall of duct 54 has two series of spaced, aligned nozzles 57 with orifices disposed to eject pressurized fluid streams obliquely through slot 15 into zone X of the liquid bath. Similarly, the top wall of duct 55 has two series of nozzles 58 with orifices aimed obliquely into slot 15 while the bottom wall of duct 55 has two series of nozzles 59 with orifices set to send pressurized jet streams obliquely through slot 16 into zone X. The top wall of duct 56 likewise is provided with two series of nozzles 60 with orifices aimed to shoot jet streams obliquely through slot 16 into zone X.

The multiplicity of pressured streams from nozzles 57,58 scrub conveyor belts A,B and the product carried therebetween through slot 15 while the jet streams from nozzles 59,60 likewise impinge obliquely on the return run of belt B passing through slot 16 and effect scrubbing thereof.

The desirable option of forming an elongate channel leading to and/or from slots 15,16 in wall 11 is illustrated by a pair of parallel baffles 61,62 in zone X attached to ducts 54,56, respectively, and a pair of parallel baffles 63, 64 in zone Y also attached to ducts 54,56, respectively.

In FIGS. 1 and 2, wall 11 has two slots 15,16 for the passage of conveyor belts therethrough. However, when using the paired conveyor belts with zigzag travel of U.S. Pat. No. 4,522,217 it is possible to have only one slot in the wall between the two zones of the liquid bath. As illustrated by FIG. 1 of U.S. Pat. No. 4,522,217, the return run of belt B can be outside the liquid bath so that the lower slot 16 in FIG. 1 herein can be eliminated together with nozzles 20 and the lower series of nozzles 19.

As a specific example of the apparatus of FIG. 1 and FIG. 3 for cooking ravioli, metal mesh conveyor belts A,B are 16½ inches wide and the spacing between them is ¾ inch. Insulated wall 11 is 4 inches wide and slots 15 and 16 measure vertically 1⅜ inches and ⅜ inch, respectively. Headers 17A, 18A, 19A, 20A are pipes having an outside diameter of 1 inch and a wall thickness of ⅛ inch, and each header has its series of aligned nozzles spaced 3 inches from one another. The orifice of all the nozzles is 1/32 inch in diameter. Shields 50,51,52,53 individually extend from wall 11 a horizontal distance of 18 inches. Cool water at a temperature of 50° F. and a gauge pressure of 70 pounds per square inch issues as jet streams from the plurality of nozzles 17,18,19,20 into wall slots 15,16 and the channel formed by baffles 50,51 while entraining cool water from zone from zone Y through the channel formed by baffles 52,53. The water jets from nozzles 17,18 and upper 19 scrub the ravioli, loosening gelatinous starch on their surface and conveying the gelatinous matter into zone X so that the cool water in zone Y remains relatively clear and the ravioli discharged at point 14 have a glistening, clean appearance. The jets from nozzles 17,18 and upper 19 also remove considerable heat stored in the ravioli and belts A,B leaving the boiling water in zone X through the channel formed by baffles 50,51 so that the removed heat is carried back by the water into zone X rather than being dissipated in zone Y where the water is desirably maintained cold. If a different pasta product, e.g., lasagna ribbons, is processed in the apparatus of FIG. 1 and FIG. 3, the water pressure in headers 17A,18A,19A,20A may be changed considerably depending on the weight of the product and speed of belts A,B. In most cases, the water gauge pressure is in the range of 10 to 100 pounds per square inch and the orifice diameter of the nozzles is usually in the range of about 0.020 to 0.125 inch. Also, as previously stated, steam or compressed air may be supplied to headers 17A,18A,19A,20A instead of water.

Many variations and modifications of the invention will be apparent to those skilled in the art without departing from the spirit and scope of the invention. For instance, duct 54 with baffles 61,63 of FIG. 4 may be used in FIG. 3 in lieu of headers 17A,18A, and baffles 50,52. Similarly, duct 56 with baffles 62,64 of FIG. 4 may replace header 20A and baffles 51,53 in FIG. 3. While four baffles are shown in each of FIG. 3 and FIG. 4 to optimize the desired effects of the pressurized fluid streams directed through the slotted wall, the nozzles of this invention still benefit the operation of the two-zone bath without any baffle or with less than four baffles. For example, if the number of baffles is to be reduced in FIG. 4, for most operations baffle 64 may be eliminated in preference to baffle 63, and baffles 63,64 may be eliminated in preference to baffles 61,62. Also, for narrow slot 16 one set of nozzles 59 or 60 may in some cases be adequate instead of using both sets of nozzles 59 and 60. Accordingly, only such limitations should be imposed on the scope of the invention as are set forth in the appended claims.

What is claimed is:

1. In apparatus for treating a product in a liquid bath having two different temperature zones separated by a slotted wall which comprises at least two continuous conveyor belts arranged to transport said product while captured between said belts through one of said zones, through a slot in said wall, and through the other of said zones, the improvement comprising a plurality of nozzles positioned with their orifices directed to eject pressurized fluid streams through said slot in said wall into one of said zones to entrain liquid of said liquid bath through said slot.

2. The improvement of claim 1 wherein baffles are disposed adjacent the slot in the wall and form a channel for the flow of liquid from one zone to the other zone of the liquid bath.

3. The improvement of claim 1 wherein a pair of baffles form a channel extending from the slotted wall into one zone of the liquid bath and another pair of baffles form an extension of said channel from said slotted wall into the other zone of said liquid bath.

4. The improvement of claim 1 wherein the slotted wall has two slots for the passage of conveyor belts therethrough and a header is disposed adjacent and parallel to said wall between said two slots, said header having two series of nozzles, the orifices of one series of nozzles being directed to eject pressurized fluid streams through one of said slots and the orifices of the other series of nozzles being directed to eject pressurized fluid streams through the other of said slots.

5. The improvement of claim 4 wherein a header having a series of nozzles with their orifices directed to eject pressurized fluid streams through the upper of the two slots is disposed adjacent and parallel to the slotted wall and a header having a series of nozzles with their orifices directed to eject pressurized fluid streams through the lower of said two slots is disposed adjacent and parallel to said slotted wall.

6. An apparatus for treating a product in a liquid bath which comprises an elongate tank, partitioning means in said tank intermediate and transverse to the length of said tank thereby forming two zones in said liquid bath, said partitioning means having at least one slot so that said liquid bath can flow from one to the other of said zones, at least two continuous conveyor belts arranged to transport said product while captured between said belts through one of said zones, through said slot, and through the other of said zones, a first series of nozzles with their orifices directed to eject pressurized fluid streams obliquely toward the top of said belts and through said slot to entrain liquid of said liquid bath through said slot, and a second series of nozzles with their orifices directed to eject pressurized fluid streams obliquely toward the bottom of said belts and through said slot to entrain liquid of said liquid bath through said slot.

7. The apparatus of claim 6 wherein a pair of baffles form a channel extending from the slot into one zone of the liquid bath and another pair of baffles form an extension of said channel from said slot into the other zone of said liquid bath.

8. The apparatus of claim 6 wherein two spaced continuous conveyor belts are arranged to transport the product down a zigzag path in one zone of the liquid bath, through the slot and up a zigzag path in the other zone of said liquid bath.

9. The apparatus of claim 8 wherein the partitioning means has two slots, an upper slot for the passage of the two conveyor belts therethrough and a lower slot for the passage of the return run of one of said belts therethrough, and there is a third series of nozzles with their orifices directed to eject pressurized fluid streams obliquely toward said return run and through said lower slot to entrain liquid of the liquid bath through said lower slot.

10. The apparatus of claim 9 wherein a header has two series of nozzles, the orifices of one series of nozzles being directed to eject pressurized fluid streams through the upper slot and the orifices of the other series of nozzles being directed to eject pressurized fluid streams through the lower slot.

11. The apparatus of claim 9 wherein a first baffle extends horizontally from the top edge of the upper slot into one zone of the liquid bath and a second baffle extends horizontally from the bottom edge of the lower slot into said one zone.

12. The apparatus of claim 8 wherein the slot in the partitioning means is formed between two spaced ducts having a rectangular cross-section, the bottom wall of the upper duct has the first series of nozzles with their orifices directed toward the top of the conveyor belts and the top wall of the lower duct has the second series of nozzles with their orifices directed toward the bottom of said belts.

13. The apparatus of claim 12 wherein a third duct having a rectangular cross-section is spaced from the lower duct to provide a second slot in the partitioning means, the bottom wall of said lower duct has a third series of nozzles with their orifices directed obliquely through said second slot, and the top wall of said third duct has a fourth series of nozzles with their orifices directed obliquely through said second slot.

14. The apparatus of claim 13 wherein a pair of baffles extend horizontally from the opposite vertical walls of the upper duct, and a pair of baffles extend horizontally from the opposite vertical walls of the third duct.

* * * * *